Sept. 27, 1966            L. Y. CARD            3,275,373
INFANT-HOLDING ATTACHMENT FOR AUTOMOBILE SEATS
Filed Oct. 15, 1964
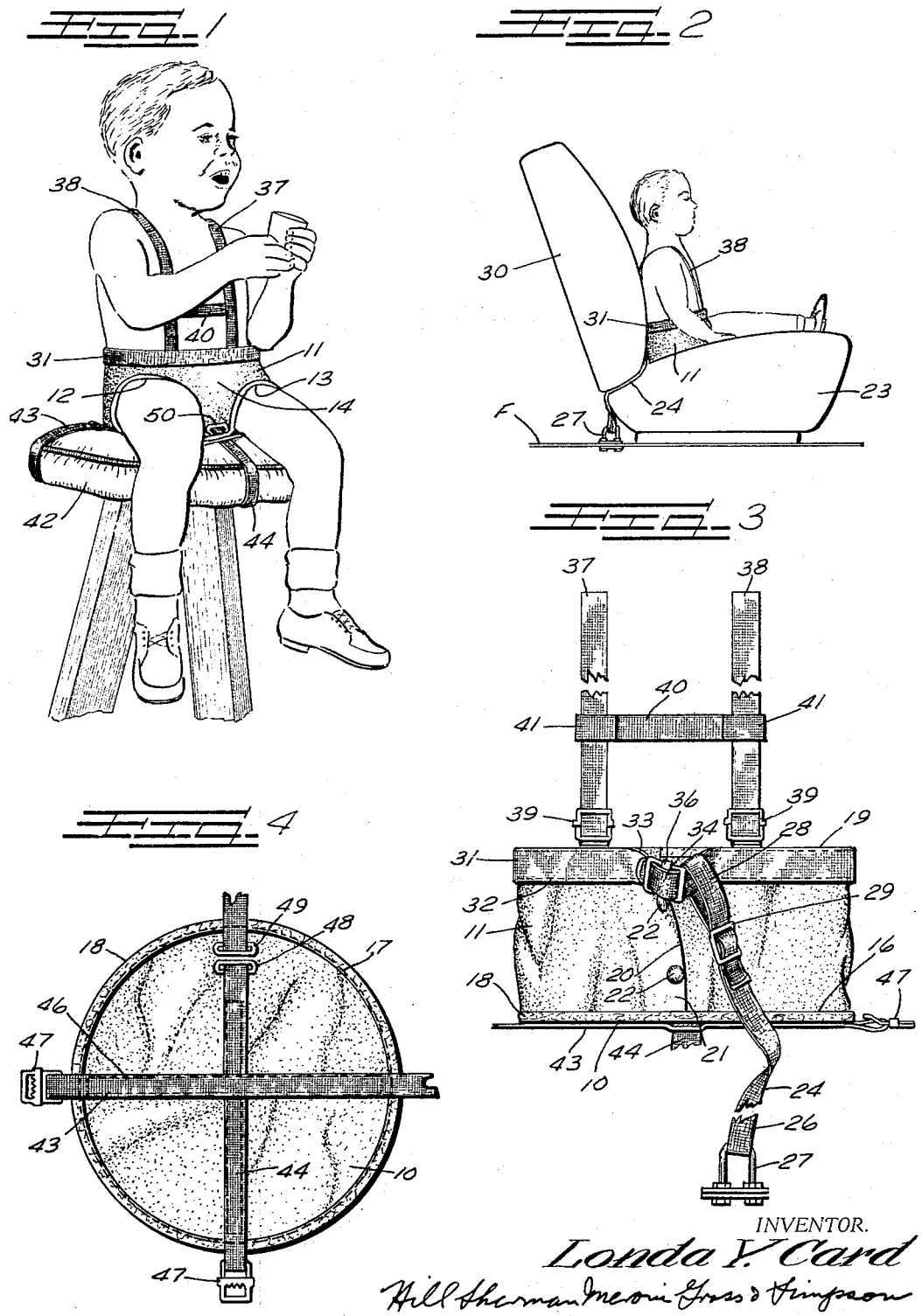
INVENTOR.
Londa Y. Card
BY                                  ATTORNEYS

United States Patent Office 3,275,373
Patented Sept. 27, 1966

3,275,373
INFANT-HOLDING ATTACHMENT FOR AUTOMOBILE SEATS
Londa Y. Card, 860 SW. 31st Ave., Miami, Fla.
Filed Oct. 15, 1964, Ser. No. 404,012
1 Claim. (Cl. 297—389)

This application is a continuation-in-part application to my earlier application Serial No. 231,684 which issued into Patent No. 3,165,358 on January 12, 1965.

This invention relates generally to an infant-holding attachment for safely and comfortably holding an infant on a seat and more particularly relates to an attachment adapted to be useful not only in securing an infant on the usual seat such as a stool, but also useful in safely holding the infant on the seat of a vehicle.

An object of this invention is to provide an infant-holding attachment adapted to be mounted on a "stationary" seat such as a stool for preventing the infant from falling off of the stool, and adapted to be alternatively used in a vehicle for not only preventing the infant from falling off of the vehicular seat but also for providing support for the infant's torso during sudden changes in speed of the vehicle.

Another object of this invention is to provide infant-holding means which can be readily attached to and detached from a seat.

Another object of the invention is to provide a seat attachment in which an infant may be readily placed and secured and from which the infant may be readily released.

A further object of the invention is to provide an infant-holding attachment for vehicular seats which permits considerable freedom of movement of the legs, arms and upper parts of the body of the infant while affording support of the infant's torso and distributing forces acting thereon during change in speed of the vehicle, particularly deceleration caused by sudden braking of the vehicle.

Still another object of this invention is to provide a simple, economical and easily constructed infant-holding attachment which is very durable.

Many other features, advantages and additional objects of the present invention will become manifest to those versed in the art upon making reference to the detailed description which follows and the accompanying sheet of drawings, in which preferred embodiments incorporating the principles of the present invention are shown by way of illustrative example only.

In the drawings:

FIGURE 1 is a perspective view of an infant-holding attachment constructed in accordance with the principles of the present invention secured to a stool and holding an infant thereon;

FIGURE 2 is a perspective view showing the attachment of FIGURE 1 secured to a vehicle and holding an infant on the seat of the vehicle;

FIGURE 3 is a rear vertical elevational view of the attachment; and

FIGURE 4 is a bottom plan view of the attachment.

As shown on the drawings:

Although the principles of this invention are of utility in any seat attachment for holding an infant on a "stationary" seat such as a stool as illustrated in FIGURE 1, a particularly useful application is made to an attachment adapted to alternatively hold an infant on a vehicular seat such as the seat of an automobile as illustrated in FIGURE 2.

In general, the seat attachment of the present invention includes a base or flat bottom member 10 adapted to be disposed on the seat, and a flexible fabric band or girdle 11 for completely encircling and for providing support for the lower portion of the torso of the infant. A pair of openings 12 and 13 are formed in a front portion 14 of the band 11 in spaced-apart relation through which the infant's legs extend. The leg openings 12 and 13 extend and open upwardly from the bottom member 10 such that the infant's legs rest directly on the flat bottom member 10 and are not subjected to discomfiture due to creases or folds at the bottom portions of the leg openings.

A bottom end 16 of the band 11 is securely affixed to the bottom member 10 around the periphery of the bottom member by means of stitching 17 and if desirable an additional piece of farbric 18 may be folded over and stitched to a portion of the band 11 and the bottom member 10 in order to provide additional strength at this connection.

The vertical dimension of the band 11 is such that an upper end 19 thereof encircles the torso of the infant and the diameter of the band 11 is dimensioned such that the entire lower portion of the torso of the infant is somewhat snugly, and yet not tightly, encircled by the band.

In order to easily place the infant into the attachment and to remove the infant from the attachment, the band 11 is split as at 20 at a rear portion 21 thereof. Suitable fastening means are provided on the band 11 at the split 20 for connecting the loose ends of the band and in the exemplary embodiment illustrated such fastener means comprises a plurality of snaps 22 although a conventional zipper or other fastening devices may be advantageously employed.

When the attachment is used in holding an infant on a vehicular seat it is desirable to connect the attachment securely to a fixed member of the vehicle, since sudden changes in the speed of the vehicle could cause movement of the seat, as for example the automobile seat 23 in FIGURE 2, with respect to a fixed member or frame of the vehicle, as for example, the floor of the vehicle indicated at F, and could also cause the infant to be thrown from the seat.

In order to maintain the infant relatively immobile with respect to a fixed member of the vehicle a tension strap 24 is provided for connection in fixed assembly to the floor F, frame or other fixed member of the vehicle. For example, a lower end 26 of the strap 24 is provided with a "U" bolt assembly 27 for rigid yet detachable connection to the floor F.

An upper end 28 of the strap 24 is folded over in the form of a loop and is provided with a buckle 29 for selectively adjusting the length of the strap 24 in order to accommodate various seating arrangements and to maintain the back of the lower portion of the torso of the infant somewhat snugly against the back rest 30 of the seat.

The tension strap 24 is connected to the band 11 through a waist strap 31, which is made of heavier or stronger material than the band and which is securely fastened to the band at the upper end 19 thereof by means of stitching as at 32. As best seen in FIGURE 1 the heavy waist strap 31 encircles the waist of the infant above the leg openings 12 and 13 of the band 11. A pair of loose ends 33 and 34 are not stitched or otherwise attached to the band 11 and are of sufficient length to extend across the split 20. A buckle 36 is mounted on the loose ends 33 and 34 for detachably interconnecting them and for providing some adjustment in the length or size of the waist strap 31.

As seen best in FIGURE 3, the loop formed at the upper end 28 of the tension strap 24 is folded over the loose ends 33 and 34 of the waist strap 31. As a consequence a substantial portion of any force applied by the tension strap to the infant will be applied through the waist strap 31. By applying a substantial portion of such force to the infant in the area of the infant's waist, any "jack-knifing" effect which would result at the infant's hips during sudden braking of the vehicle is minimized. On the other hand, the loss of freedom of movement above the waist which would result if such force were applied in the shoulder area of the infant is also avoided.

In addition, a portion of such applied force due to braking will act upon the infant in the area of the front portion 14 of the band 11 and also around the leg openings 12 and 13 as a result of the shape of the band 11. The applied force is therefore distributed somewhat along the front portion of the infant's torso from the waist down.

In order to prevent the infant from removing himself from the attachment and also to enhance the distribution of the force acting on the infant, a pair of shoulder straps 37 and 38 are provided for extending somewhat snugly over the shoulders of the infant. The ends of the shoulder straps 37 and 38 are stitched, respectively, to front and rear portions of the waist strap 31 in spaced relation to each other. A buckle 39 is provided on each of the shoulder straps for adjusting the length of the straps and are preferably positioned at the rear of the attachment to prevent adjustment thereof by the infant.

In addition, a pair of connecting straps as at 40 are adapted to extend transversely between and interconnect the shoulder straps 37 and 38 so that the straps will not slip off of the shoulders of the infant. A loop 41 is formed at the opposite ends of the connecting straps to permit a sliding vertical adjustment of the connecting straps on the shoulder straps.

The arrangement of the shoulder straps 37 and 38 is such that a tendency of the infant's shoulders to jerk forwardly due to sudden braking of the vehicle with restrained movement of the infant's torso, will be resisted. In addition, increased tensioning of the shoulder straps as a result of such forward movement of the infant's shoulder will result in an imposition of a force on the chest of the infant to further distribute the overall force acting on the infant.

In order to accommodate mounting of the attachment on a "stationary" seat such as, for example, the stool as shown at 42 in FIGURE 1, a pair of bottom straps 43 and 44 are secured in crossing relation to the underside of the bottom member 10 by means of stitching as at 46. The straps are provided with buckles as at 47 for detachably securing the bottom member to the stool. The bottom strap 43 extends from side to side of the bottom member 10 while the strap 44 extends from front to rear. A pair of grommets 48 and 49 are fastened to the bottom member 10 at the front portion thereof and in assembled condition the strap 44 extends upwardly through the grommet 48 through a grommet 50 mounted in the band 11 between the leg openings 12 and 13, and then down through the grommet 49, after which it is wrapped underneath the stool 42 in the manner illustrated in FIGURE 1.

Thus, there has been provided an infant's seat attachment which can be effectively utilized for holding an infant on seats, such as stools as well as vehicular seats. The attachment allows considerable freedom of movement of the infant without defeating the main purposes for which it is intended notably, to safely and securely hold the infant on the seat.

With respect to the use of the attachment in vehicles, the arrangement of the instant invention provides for a distribution of the force acting on the infant, particularly during periods of sudden deceleration of the vehicle. In addition, the invention resists "jack-knifing" of the infant and the deleterious effects which may result therefrom.

Although minor modifications might be suggested by those versed in the art, it should be understood that I wish to embody within the scope of the patent warranted hereon all such modifications as reasonably come within the scope of my contribution to the art.

I claim as my invention:

In an infant-holding attachment adapted for use in a vehicle for safely holding an infant in the seat of the vehicle, a flat bottom member arranged for disposition on the seat, a flexible fabric band affixed to the periphery of the bottom member and extending upwardly therefrom for completely encircling a lower portion of the infant's torso, means forming a pair of spaced openings in a front portion of said band extending upwardly from said bottom member through which, respectively, the infant's legs may extend, said band being vertically split at a rear portion thereof and having cooperating fastening means at said split to provide for selectively opening the rear portion of said band, a waist strap extending around said band above said openings and affixed to said band around to said split to provide a pair of loose ends at said split, buckle means on said loose ends for interconnecting the loose ends across said split, a pair of elongated adjustable shoulder straps secured respectively at the ends thereof to front and rear portions of said waist strap and arranged to extend over the infant's shoulders, a pair of connecting straps extending transversely to said shoulder straps and connected at opposite ends thereof to said shoulder straps, said connecting straps including means operative to provide adjustably slidable movement of said connecting straps along the length of said shoulder straps, an elongated tension strap having a loop formed at one end thereof encircling the buckled loose ends of said waist strap, a buckle on the loop of said tension strap for selectively adjusting the length of said tension strap, and means at an opposite end of said tension strap for connection to a fixed member of the vehicle.

References Cited by the Examiner

UNITED STATES PATENTS

| | | | |
|---|---|---|---|
| 2,170,703 | 8/1939 | Waxman et al. | 297—389 X |
| 2,652,183 | 9/1953 | Hlivka | 297—385 X |
| 2,877,833 | 3/1959 | Boles | 297—389 |
| 2,908,324 | 10/1959 | Muller et al. | 297—389 |
| 3,028,200 | 4/1962 | Dye | 297—389 |
| 3,125,375 | 3/1964 | Bird et al. | 297—389 |
| 3,165,358 | 1/1965 | Card | 297—389 |

FRANK B. SHERRY, *Primary Examiner.*

R. B. FARLEY, *Assistant Examiner.*